July 17, 1962 E. CECERE 3,044,171
SURGICAL SAW
Filed July 17, 1961
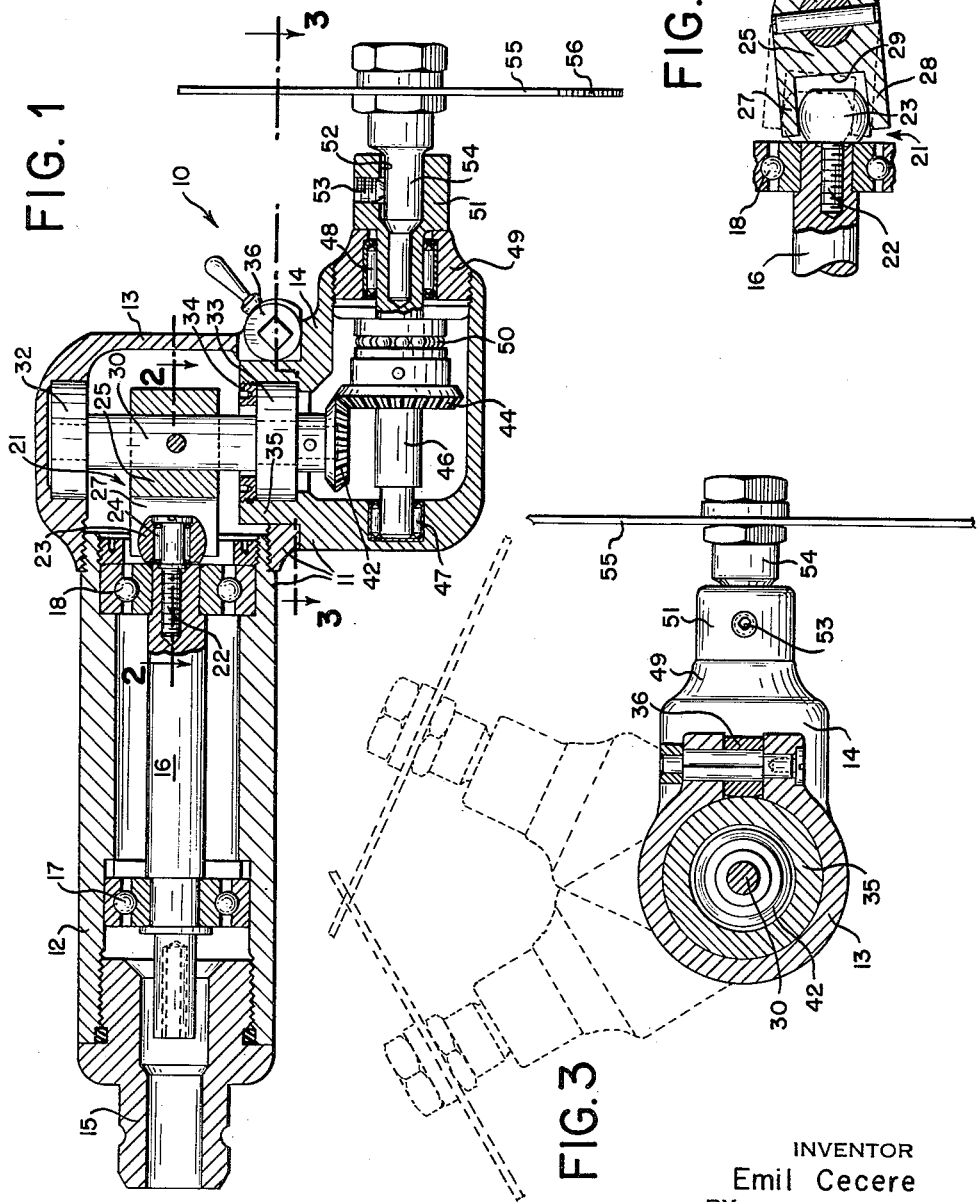
INVENTOR
Emil Cecere
BY Pennie, Edmonds, Morton, Barrows & Taylor
ATTORNEYS

United States Patent Office 3,044,171
Patented July 17, 1962

3,044,171
SURGICAL SAW
Emil Cecere, Wayne, N.J., assignor to Howe Sound Company, a corporation of Delaware
Filed July 17, 1961, Ser. No. 124,583
3 Claims. (Cl. 30—166)

This invention relates to a surgical saw, and more particularly, to a surgical saw having a multi-positional head.

Surgical saws of the type having a high-speed short-stroke saw blade which are used for various bone cutting operations as well as for cutting of plaster casts, have heretofore been provided with saw blades having a single fixed position. In using such a saw the surgeon often is faced with situations in which it is difficult for him to make the correct cut because the patient's bone to be cut is in an awkward position relative to the incision. This in some cases may necessitate making the cut at an alternate angle. Owing to the fact that the correct angle is not the optimum one for the convenience of the surgeon, the difficulty of the operation and the skill and care required of him is increased.

I have found that by employing a multi-positional head on such a saw and providing means for oscillating the saw blade with high-speed short strokes regardless of the position of the head, many of the surgeon's existing problems are simplified, and an improved surgical saw having increased flexibility and utility as compared with heretofore known saws of this type is realized. It has particularly been found that the correct angle of cut can almost always be made with minimum difficulty, with consequent simplification of the surgeon's work and with corresponding benefit to the patient, when the angle of cutting head of the saw can be adjusted to suit the conditions of the operation.

The saw of the invention consists essentially of a casing to which a swivel head is attached and pivotal thereon. A saw blade is mounted in and extends away from the swivel head. Means are provided within the casing and the swivel head for oscillating the saw blade in a plane substantially perpendicular to the plane in which the swivel head turns in every position of the swivel head.

A preferred embodiment of the invention is described hereinbelow with reference to the drawing wherein:

FIG. 1 is a cross-sectional side elevation of the saw;
FIG. 2 is a section taken along lines 2—2 of FIG. 1; and
FIG. 3 is a section taken along lines 3—3 of FIG. 1 with dotted portions showing the head in different positions.

Referring initially to FIG. 1, a saw 10 has a casing 11 which includes a tubular sleeve 12 and a substantially cylindrical housing 13 attached to one end of the sleeve. Depending from the housing 13 and attached thereto in rotatable relationship is a substantially L-shaped swivel head 14. Secured to the end of the tubular sleeve 12, opposite to the end on which the housing 13 is attached, and adapted to receive and maintain a drive member in contact therewith is a connector 15. Mounted substantially axially within the tubular sleeve 12 and extending adjacent the connector so as to be engaged by the drive member is a drive shaft 16. The drive shaft freely revolves at high speeds on ball bearings 17 and 18 which are mounted securely within the tubular sleeve 12.

The saw illustrated in this embodiment is of the type adapted to be driven by a motor mounted remote from the immediate area of the operating table, with the drive force being transmitted therefrom by means of a flexible drive shaft. By means of this construction the saw can be disconnected from its drive source and sterilized in an autoclave prior to the operation. Moreover, the motor can be mounted in a remote and thereby explosion proof area. It is also contemplated that the drive motor could be mounted on the housing 13 and become a part thereof. A saw constructed in this way would be particularly suited for use as a saw for plaster casts.

A cam 21, which is best shown with reference to FIG. 2 as well as FIG. 1, is provided to translate high-speed rotational movement of the drive shaft 16 to a short-stroke oscillatory motion. The cam 21 consists essentially of a threaded member 22 which is eccentrically mounted within the drive shaft 16 and rotatable therewith, and a rounded head 23 which is mounted on the threaded member 22 and freely rotatable thereon by means of a roller bearing 24 disposed between the head and the threaded member. Operatively associated with the cam 21 is a cam follower 25 which consists essentially of a yoke having arms 27 and 28 extending therefrom toward the cam and defining a recess 29 in which the head 23 is confined. Rotation of the head 23 within the recess 29 causes the cam follower 25 which is securely attached to a second shaft 30 to oscillate about an axis perpendicular to the drive shaft 16. Hence the second shaft 30 is coaxial with the cam follower 25 and its axis extends perpendicular to the drive shaft 16. One end of the shaft 30 rides in a bearing 32 mounted in the housing 13 and the other end is disposed within a bearing 33 which is mounted in the swivel head 14. A retaining nut 34 is screwed in the head 14 at this point and thereby maintains the bearing 33 in its proper position.

As shown, a portion 35 of the head 14 in which the bearing 33 is mounted has a smaller diameter than the diameter of the opening formed by the housing 13, and the head is thereby pivotable through 360° on the housing. A lock 36 as best shown in FIG. 3 as well as FIG. 1, is provided to maintain the swivel head 14 in any given position with respect to the housing 13. The lock shown is simply a disc eccentrically mounted about a rectangular pivot member which is adapted to abut against the portion 35, and this is one type of many which could be employed for this purpose.

Securely mounted on the end of the second shaft 30 under the bearing 34 and reciprocal therewith is a bevel gear 42. The bevel gear 42 extends into the swivel head 14 and meshes with a second bevel gear 44, which is securely attached to a rocker shaft 46. The rocker shaft 46 is mounted within the head 14 with its axis perpendicular to the axis of the second shaft 30. One end of the shaft 46 is mounted in a roller bearing 47 disposed in the side of the head 14 and the other end portion is similarly mounted in a second roller bearing 48 which is held in the opposite side of the head 14 by means of a threaded collar 49. A ball bearing 50 spaces the second bevel gear 44 from the collar 49 and promotes freedom of oscillation of the gear 44.

The shaft 46 expands to a larger diameter along the end portion 51 which extends out from the head 14. A recess 52 is formed within the end portion 51 and extends further axially into the shaft 46. Inserted within the recess 52 and rigidly held therein by means of a set screw 53 is a male plug member 54. A saw blade 55 is releasably attached to the plug member 54. The blade 55 shown has teeth formed only on one portion 56, but adjustment means are provided in that the plug member 54 can be rotated within the recess 52 and can be held in any position by means of the set screw 54.

In operation, the outside drive means is connected to the saw 10 thereby causing the drive shaft 16 to rotate at speeds of about 25,000 revolutions per minute. The cam 21 which is eccentrically mounted on the shaft 16 rotates with the shaft and displaces the cam follower 25 causing it to oscillate about the shaft 30 in an axis perpendicular to the drive shaft 16. This oscillatory motion is translated by means of the bevel gears 42 and 44 to the rocker shaft 46 and ultimately to the saw 55 which oscillates in a plane perpendicular to the plane in which the swivel head pivots.

When the lock 36 is released, the swivel head 14 is free to rotate substantially 360° (limited in this embodiment by the size of the blade) and can assume various positions such as indicated in FIG. 3. According to the construction of this preferred embodiment when the swivel head is rotated, the bevel gear 44 rides around the bevel gear 42 and is thereby always maintained in contact therewith. Hence, by providing such means, the high-speed short-stroke oscillation of the saw blade is achieved in every position of the swivel head 14. When the swivel head 14 is rotated, the shaft 46, with the blade 55 rigidly connected thereto, will also be rotated about its axis. Thus, when a circular saw is not being used but rather a saw having only a limited portion with teeth formed thereon, as shown, it will be necessary to readjust the blade so that the tooth portion is in its proper position. This can be easily accomplished with the adjustment means by simply loosening the set screw 53 and rotating the plug 54 within the recess 52.

It is evident that owing principally to the multi-positional head, the new surgical saw possesses much greater flexibility and utility than has heretofore been achieved in surgical saws of this type. Hence, the new saw can be used for cutting bones in various operations where the delicate nature of the operation requires a small incision at a predetermined angle and the area to be cut cannot be reached with great facility and freedom of positioning on the part of the surgeons. It can also be used to advantage for cutting plaster casts without need of employing special sized blades around the joints and other ordinarily difficult to reach places.

I claim:

1. A high-speed short-stroke saw for cutting plaster casts, bone, and the like comprising a casing, a swivel head attached to and pivotal on said casing, a saw blade mounted in and extending from said swivel head, and means within the casing and the swivel head for oscillating said saw blade in a plane substantially perpendicular to the plane in which the swivel head turns in every position of the swivel head.

2. A high-speed short-stroke saw for cutting plaster casts, bone, and the like comprising a casing, a swivel head attached to and rotatable on said casing, a saw blade mounted in said swivel head and extending therefrom with the blade axis in substantially the plane of rotation of the swivel head, a drive shaft in said casing, cam means connected to said drive shaft for translating high speed rotational movement to oscillatory movement, means for transmitting said oscillatory movement to said saw blade and to oscillate the blade in a plane substantially perpendicular to the plane in which the swivel head turns in every position of the swivel head, and locking means for securing the swivel head against rotation in any given position.

3. A high-speed short-stroke saw for cutting plaster casts, bone, and the like comprising a casing, a drive shaft rotatably mounted in said casing, a cam eccentrically mounted on said shaft, a cam follower adapted to oscillate about an axis perpendicular to the drive shaft, a second shaft mounted in said casing coaxial with the cam follower, a swivel head attached to said casing substantially at one end of said second shaft and pivotal on said casing in a plane perpendicular to the axis of the second shaft, a rocker shaft rotatably mounted in said swivel head, a saw blade rigidly attached to the rocker shaft, means for transmitting the oscillatory motion of the second shaft to the rocker shaft and to oscillate the blade in a plane perpendicular to the plane in which the swivel head turns in every position of the swivel head, adjustment means for positioning the saw blade in the rocker shaft, and locking means for securing the swivel head against rotation in any given position.

No references cited.